Figure 1:
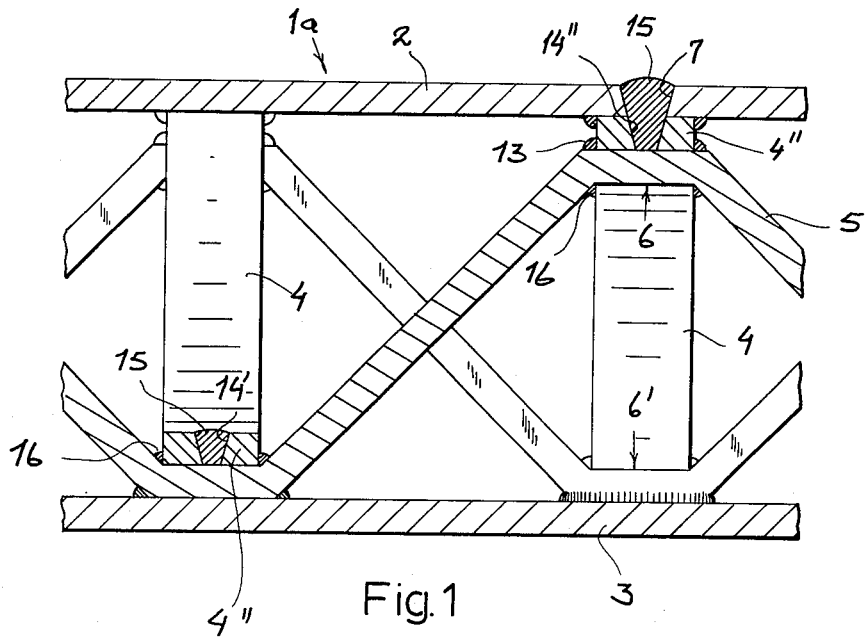

July 5, 1966        H. HABERBOSCH        3,258,891

LIGHTWEIGHT PREFABRICATED STRUCTURAL ELEMENT

Filed Aug. 17, 1961

Helmut Haberbosch
INVENTOR.

BY    *Ross & Mestern*

United States Patent Office 3,258,891
Patented July 5, 1966

3,258,891
LIGHTWEIGHT PREFABRICATED STRUCTURAL ELEMENT
Helmut Haberbosch, Bahnerstrasse 2, Lauingen, Swabia, Germany
Filed Aug. 17, 1961, Ser. No. 165,466
Claims priority, application Germany, Aug. 20, 1960, H 40,257
3 Claims. (Cl. 52—615)

My present invention relates to construction elements and, more particularly, to an improved lightweight prefabricated element adapted to form a wall of a structure.

While the manufacture of lightweight wall-forming structural elements from a pair of spaced plates interconnected by transverse struts has been proposed heretofore, such constructions have generally proved to be unrealizable or unsatisfactory since these known elements required the struts to be affixed to both plates internally. Whereas the attachment, usually by riveting, of a strut to one of the plates presents little difficulty, the securing of the free end of the strut to the other plate is impossible when rivets necessitating forming heads disposed within the element are to be employed. The use of so-called "spring" or "self-flaring" rivets to secure the transverse struts to the plates has also been found to be unsatisfactory since these rivets do not join the members with sufficient rigidity to withstand the stresses acting upon the aforementioned type of structural element in its usual applications.

It is an object of the instant invention to provide an improved method of making prefabricated structural elements of increased rigidity.

Another object of my invention is to provide an improved wall-forming structural element of relatively light weight and high rigidity as well as increased resistance to structural stresses.

The above and further objects, which will become apparent subsequently, are realized, in accordance with the invention, by a structural element having a pair of spacedly juxtaposed plate members interconnected by an array of generally parallel undulating struts interposed between the plates and extending generally in respective planes transversely thereto, each strut being rigidly secured at alternate peaks (e.g. its crests) to one of the plates and at the remaining peaks (e.g. its troughs) to the other plate.

According to another aspect of the invention, the undulating struts are initially welded at one set of their alternating peaks, preferably their troughs, to one surface of a plate member. A second plate member, formed with a plurality of throughgoing openings alignable with the crests of the struts, is disposed above the first plate in contact with the struts, the latter being then welded from the exterior of the element to the second plate member through the openings therein. Whereas the intial welding step is readily accomplished by conventional techniques owing to the absence of the second or cover plate, it will be apparent that such techniques would be of little avail for the securing of the second plate to the undulating struts were the aforementioned openings not provided. These welding openings enable the joining of the crests of the undulating struts to the second plate with the aid of the usual welding rod which is inserted through the openings from without to complete the welding operation. When electric-arc-welding techniques are to be used, only a single welding rod, applied in the described manner, is required, the counterelectrode being constituted by the metallic struts and plates. Similarly, when oxy-acetylene welding is used to effect the final welding step, the welding rod is again applied exteriorly of the element, thereby facilitating manipulation of the welding torch whose flame penetrates inwardly through the welding openings in the second plate member. The final welding step may also include the filling of these openings with weldment to eliminate any depressions in the surface of the second plate which otherwise would result at the weld openings. The latter may, advantageously, be bores whose walls converge conically inwardly and which are all formed in a single stamping operation during or subsequently to the fabrication of the plate.

While the aforedescribed structural element satisfactorily withstands shear stresses applied along one dimension (i.e. parallel to the struts) thereof, I prefer to employ a network of mutually perpendicular arrays of undulating struts of identical height and configuration so that the resulting element will have substantial static strength and be able to withstand shear stresses applied along substantially any dimension as well as torsional stress. The struts of the second array are, of course, secured to the superimposed plate members in the same manner as those of the first array. Whereas the struts of previously known wall-forming structural elements have been spaced apart by relatively large distances, the distance between successive crests or troughs of the undulating struts of the instant invention is on the order of the width of the interplate spacing. Advantageously, the distance between the successive crests and/or the gap between successive struts is substantially equal to the interplate spacing so that similar structural elements may be welded together substantially at right angles along the struts to provide a structure of great rigidity.

According to a further feature of my invention, the mutually perpendicular arrays of undulating struts are interleaved and so arranged that the plane of each strut of one array intersects the struts of the other array at respective peaks thereof whereby the peaks of mutually perpendicularly extending struts are located substantially along a line perpendicular to both plate members at the peaks of the struts. Advantageously, alternate struts of one array are rigidly secured to alternate peaks of the other array at their respective alternate peaks (e.g. the crests and/or troughs) so that four strut limbs converge toward each junction point. To this end the peaks of neighboring struts of each array are relatively staggered by a distance equal to one-half the intercrest spacing (i.e. the pitch of the undulations) so that crests and troughs alternate uniformly in both principal dimensions of the structure. The hollow structural elements thus formed may, according to a more particular feature of the invention, be filled with a heat- and/or sound-insulating material such as comminuted vermiculite, asbestos fibers or the like. The internal cavity of the element may, if desired, be provided with a partition disposed between the two plate members and secured to the struts, thereby subdividing this cavity into two compartments which may be filled with different types of insulating material. One compartment thus may be filled with a thermally insulating material whose sound-transmission coefficient is not negligible whereas the other compartment may be filled with a sound-absorbing material having insignificant heat-insulating capabilities to provide a complete structural element affording optimum thermal and acoustic insulating qualities.

According to a more specific feature of the invention, the two mutually perpendicular arrays of struts include marginal struts extending along the edges of the plate members, thereby reinforcing the boundaries of the prefabricated structural element so that several of them may be joined edgewise (e.g. by welding) to produce a structure provided with a large surface area and yet able to support relatively heavy loads. The undulating struts may, advantageously, comprise a plurality of substantially straight portions alternately inclined in opposite directions and merging together at the peaks of the strut. The top and bottom portions of each strut may be interconnected by intermediate portions sloping at substantially 45° with respect to the plate members. In order to enable the latter to carry substantial loads they are, preferably, of profiled cross-section (e.g. of any of the usual beam shapes), though they could also be of rounded (e.g. circular or elliptical) cross-section in which case the welding operation may be somewhat more difficult. The struts may be formed by die pressing, rolling or drawing; the peaks of the struts may, advantageously, be straight or substantially straight portions paralleling their adjoining plate members so as to afford extended contact therewith.

Figure 2:
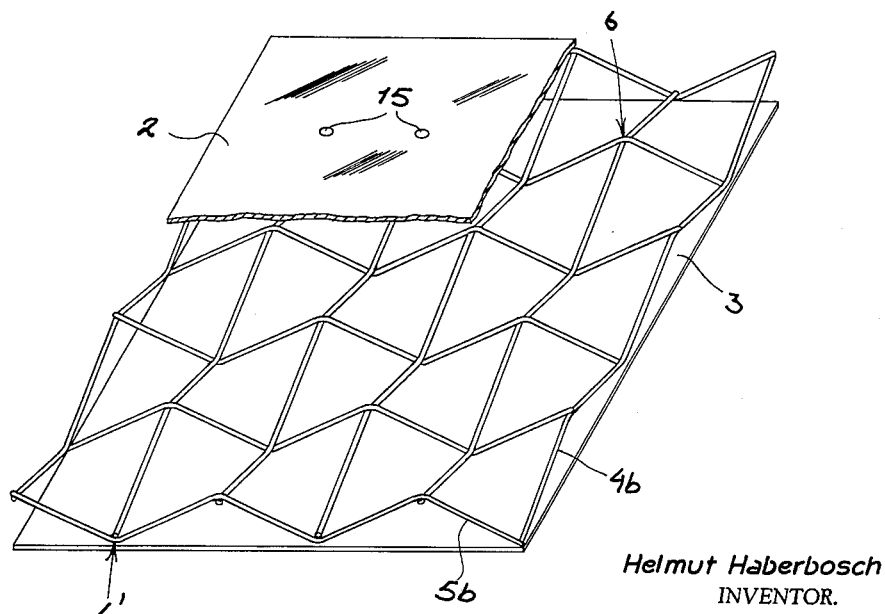

The above and other objects, features and advantages of the present invention will become more readily apparent from the following detailed description, reference being made to the accompanying drawing in which:

FIG. 1 is a longitudinal cross-sectional view through a structural element according to the invention; and FIG. 2 is a perspective view, with parts broken away, of a similar structural element.

The element can be produced (as will be apparent hereinafter) by initially welding the struts (say struts 4) of one array to the inner surface of bottom plate 3 with fillet welds 10 in the usual manner. The troughs of struts 4, 4' are, for this purpose, provided with apical portions 4" extending parallel to the bottom plate 3 so that the fillet welds 10 are of substantial length. The struts 5 of the other array, whose apical portions are likewise flattened, are then set in place and joined by fillet welds to the bottom or base plate 3 at their troughs. Next, the top or cover plate 2 is disposed upon the flattened crests of the struts 4 and 5 with the bores thereof, which have previously been provided at appropriately spaced locations along the plate, aligned with these crests. The top plate 2 is then welded from without through the bores 7 to the crests of the struts 4 and 5. The bores 7 converge conically inward to limit any pitting by the welding arc. Since the bores 7 will generally be located at predetermined uniform distances, the welding operation may, if desired, be carried out completely or partially automatically.

The structural element 1a shown in FIG. 1 has the peaks of the struts 5 and the peaks of struts 4, which are mutually perpendicular arrays, located at weldpoints 6, 6' of the plates 2 and 3, respectively, so that four straight limbs of the strut network converge toward each weldpoint. The top portions or crests of the struts 4 overlie those of the struts 5 while the bottom portions or troughs of the latter underlie the troughs of the struts 4. This element 1a is produced by welding the abutting crests and troughs of the two arrays of struts 4 and 5 together with fillet welds 13 and 16 before the cover plate 2 is superimposed thereon and attached in the aforedescribed manner. In order to facilitate the joining of the struts at their peaks, the flattened portions 4" of struts 4 may be provided with bores 14', 14" through which weld metal 15 may be deposited to join the struts. The bores 14" in the crests of struts 4 are, of course, aligned with the bores 7 of the upper plate 2 to permit the final welding step to join not only the plate 2 to the struts 4 but also the struts 4 to the struts 5. The element illustrated in FIG. 2 is similar to that shown in FIG. 1 but with the struts 4 and 5 of the latter replaced by round rods 4b, 5b. In FIG. 2, it will be noted, the two sets of struts are interwoven rather than simply superposed as in FIG. 1.

The invention as described and illustrated is deemed to admit of many modifications and variations considered to be included within its spirit and scope as defined in the appended claims.

I claim:

1. A construction element comprising a bottom plate, a top plate and a network of undulating struts of identical height and configuration interconnecting said plates in parallel-spaced relationship; said network consisting of a first array of parallel struts welded at the bottom portions of its undulations to said bottom plate, and a second array of parallel struts extending transverse to and overlying said first array and welded at the top portions of its undulations to said top plate and welded at the top portions of the undulations of said struts of the first array, said struts of said second array being welded at the bottom portions of their undulations to the bottom portions of the first array, the struts of each array being parallel and equispaced by a distance corresponding to half an undulation whereby the top and bottom portions of each strut coincide with the locations at which the top and bottom portions of the struts transversed thereby are welded to said plates, adjacent struts of each array being relatively staggered by half an undulation, the struts of said second array lying in planes at right angles to the planes of the struts of said first array.

2. A construction element as defined in claim 1 wherein at least said top plate is provided with downwardly converging perforations overlying the top portions of said struts, said perforations being filled with weld metal joining said top plate to said second array of struts.

3. A construction element as defined in claim 1 wherein said top and bottom portions of each strut are interconnected by intermediate portions sloping at substantially 45° with reference to said top and bottom plates.

References Cited by the Examiner

UNITED STATES PATENTS

| | | | |
|---|---|---|---|
| 1,939,732 | 12/1933 | Stresau | 189—36 X |
| 2,149,008 | 2/1939 | Chapman et al. | 189—36 X |
| 2,796,839 | 6/1957 | Anjeskey | 189—36 X |

FOREIGN PATENTS

| | | |
|---|---|---|
| 1,244,800 | 9/1960 | France. |
| 395,540 | 7/1933 | Great Britain. |
| 561,214 | 5/1944 | Great Britain. |
| 783,185 | 9/1957 | Great Britain. |

FRANK L. ABBOTT, *Primary Examiner.*

CORNELUIS D. ANGEL, RICHARD W. COOKE, Jr.,
*Examiners.*

W. L. SHEDD, L. R. RADANOVIC,
*Assistant Examiners.*